US011818511B2

(12) United States Patent
Serval et al.

(10) Patent No.: US 11,818,511 B2
(45) Date of Patent: Nov. 14, 2023

(54) VIRTUAL MIRROR SYSTEMS AND METHODS

(71) Applicant: CareOS, Neuilly-sur-Seine (FR)

(72) Inventors: Thomas Serval, Neuilly-sur-Seine (FR); Olivier Giroud, Neuilly-sur-Seine (FR)

(73) Assignee: CareOS, Neuilly-sur-Seine (FR)

( * ) Notice: Subject to any disclaimer, the term of this patent is extended or adjusted under 35 U.S.C. 154(b) by 0 days.

(21) Appl. No.: 17/753,163

(22) PCT Filed: Aug. 27, 2020

(86) PCT No.: PCT/IB2020/057996
§ 371 (c)(1),
(2) Date: Feb. 22, 2022

(87) PCT Pub. No.: WO2021/038478
PCT Pub. Date: Mar. 4, 2021

(65) Prior Publication Data
US 2022/0286652 A1 Sep. 8, 2022

Related U.S. Application Data

(60) Provisional application No. 62/892,367, filed on Aug. 27, 2019.

(51) Int. Cl.
*H04N 9/31* (2006.01)
*H04N 5/262* (2006.01)
*H04N 23/90* (2023.01)

(52) U.S. Cl.
CPC ......... *H04N 9/3141* (2013.01); *H04N 5/2628* (2013.01); *H04N 9/3179* (2013.01); *H04N 23/90* (2023.01)

(58) Field of Classification Search
CPC .. H04N 9/3141; H04N 5/2628; H04N 9/3179; H04N 23/90; H04N 9/3194;
(Continued)

(56) References Cited

U.S. PATENT DOCUMENTS 6,179,426 B1 * 1/2001 Rodriguez, Jr. ......... H04N 5/74
353/69
2007/0040033 A1 2/2007 Rosenberg
(Continued)

FOREIGN PATENT DOCUMENTS

CN 104575129 A * 4/2015 ............... G09B 5/06
JP 2015005823 A * 1/2015

OTHER PUBLICATIONS

Search Report and Written Opinion of International Searching Authority for Application No. PCT/IB2020/057996, dated Nov. 20, 2020 (17 pages).

*Primary Examiner* — Michael Lee
(74) *Attorney, Agent, or Firm* — Nixon Peabody LLP (57) ABSTRACT

A virtual mirror system includes a frame, a first camera, a projector, a memory, and a control system. The first camera is coupled to the frame and is configured to generate first image data reproducible as one or more first images of at least a portion of a subject that is positioned within a first field of view of the first camera. The projector is configured to display images on a vertical surface. The memory stores machine readable instructions. The control system includes one or more processors configured to execute the machine readable instructions to cause the projector to display, on the vertical surface, a virtual mirror image of the subject based on the first image data.

20 Claims, 6 Drawing Sheets

(58) Field of Classification Search
CPC .. H04N 13/243; H04N 13/239; H04N 13/111; G06F 3/011
See application file for complete search history.

(56) References Cited

U.S. PATENT DOCUMENTS

| | | | |
|---|---|---|---|
| 2010/0194862 A1* | 8/2010 | Givon | H04N 13/218 |
| | | | 348/344 |
| 2013/0145272 A1 | 6/2013 | Boggie | |
| 2014/0098179 A1 | 4/2014 | Moore | |
| 2015/0205376 A1 | 7/2015 | Kubota | |
| 2016/0127710 A1* | 5/2016 | Saban | H04N 5/2624 |
| | | | 386/241 |
| 2016/0219257 A1* | 7/2016 | Metter | G06F 3/0304 |
| 2016/0292917 A1* | 10/2016 | Dorner | G06T 19/006 |
| 2018/0253840 A1* | 9/2018 | Tran | G16H 40/63 |
| 2019/0041902 A1 | 2/2019 | Lee et al. | |

* cited by examiner

VIRTUAL MIRROR SYSTEMS AND METHODS

CROSS-REFERENCE TO RELATED APPLICATIONS

This application is the National Phase of International Application PCT/IB2020/057996, filed on Aug. 27, 2020, which designated the United States, which claims the benefit of and priority to U.S. Provisional Patent Application No. 62/892,367, filed on Aug. 27, 2019, each of which is hereby incorporated by reference herein in its entirety.

TECHNICAL FIELD

The present disclosure relates to mirrors, more specifically, the present disclosure relates to virtual mirror systems and methods of using the same.

BACKGROUND

In their daily lives, people perform many tasks in front of mirrors, such as brushing their teeth, shaving, applying makeup, and generally getting ready for their day. Typically, mirrors are fixed on a vertical surface (e.g., a wall) in bathrooms or bedrooms in homes. That is, mirrors are often stationary such that a user must stand directly in front of the mirror to see themselves and perform the aforementioned tasks, for example. The present disclosure is directed to solving these problems and addressing other needs.

SUMMARY

According to implementations of the present disclosure, a system includes a frame, a first camera, a projector, a memory, and a control system. The first camera is coupled to the frame and being configured to generate first image data reproducible as one or more first images of at least a portion of a subject that is positioned within a first field of view of the first camera. The projector is configured to display images on a vertical surface. The memory stores machine-readable instructions. The control system includes one or more processors configured to execute the machine readable instructions to cause the projector to display, on the vertical surface, a virtual mirror image of the subject based on the first image data, wherein the virtual mirror appears to the subject as a mirror image of the at least a portion of the subject.

According to some implementations of the present disclosure, a method includes receiving, from a first camera coupled to a frame, first image data reproducible as one or more first images of at least a portion of a subject that is positioned within a first field of view of the first camera. The method also includes generating a virtual mirror image of the portion of the subject based on the first image data from the first camera. The method also includes causing a projector coupled to the frame to display the virtual mirror image of the portion of the subject on a vertical surface.

According to some implementations of the present disclosure, a virtual mirror system includes a first camera, a second camera, a project, a memory, and a control system. The first camera is configured to generate first image data that is associated with a subject when the subject is positioned within a first field of view (FOV) of the first camera, the first camera being mounted such that a central axis of the first FOV is at a first angle relative to a first vertical plane and at a second angle relative to a first horizontal plane. The second camera is configured to generate second image data that is associated with the subject when the subject is positioned within a second field of view (FOV) of the second camera, the second camera being mounted such that a central axis of the second FOV is at a third angle relative to a second vertical plane and at a fourth angle relative to a second horizontal plane, the second camera being positioned relative to the first camera such that a portion of the first FOV overlaps with a portion of the second FOV. The projector is configured to emit electromagnetic radiation onto a virtual mirror surface, the projector being mounted such that a central axis of the projector is at a fifth angle relative to a third vertical plane and at a sixth angle relative to a third horizontal plane. The memory storing machine readable instructions. The control system including one or more processors configured to execute the machine readable instructions to: generate a real-time video feed of at least a portion of the subject based at least on the first image data and the second image data and display on the virtual mirror surface, using the projector, at least a portion of the generated real-time video feed of the portion of the subject.

According to some implementations of the present disclosure, a virtual mirror system includes a frame, a first camera, a second camera, a mirror, a projector, a memory, and a control system. The first camera is coupled to the frame and generates first image data reproducible as one or more first images of at least a portion of a subject that is positioned within a first field of view of the first camera. The second camera generates second image data reproducible as one or more second images of at least a portion of the subject that is positioned within a second field of view of the second camera. The mirror coupled to the frame and being positioned between the first camera and the second camera. The projector is coupled to the frame. The memory storing machine readable instructions. The control system includes one or more processors configured to execute the machine readable instructions to generate a real-time video feed of at least a portion of the subject based on the first image data and the second image data and cause the projector to continuously display the real-time video feed of the portion of the subject on at least a portion of the mirror.

The foregoing and additional aspects and implementations of the present disclosure will be apparent to those of ordinary skill in the art in view of the detailed description of various embodiments and/or implementations, which is made with reference to the drawings, a brief description of which is provided next.

BRIEF DESCRIPTION OF THE DRAWINGS

The foregoing and other advantages of the present disclosure will become apparent upon reading the following detailed description and upon reference to the drawings.

FIG. 4A is an exemplary first image of a subject generated by a first camera of the virtual mirror system of FIGS.

2A-2B at a first point of view, according to some implementations of the present disclosure;

While the present disclosure is susceptible to various modifications and alternative forms, specific implementations and embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the present disclosure as defined by the appended claims.

DETAILED DESCRIPTION

Figure 1:
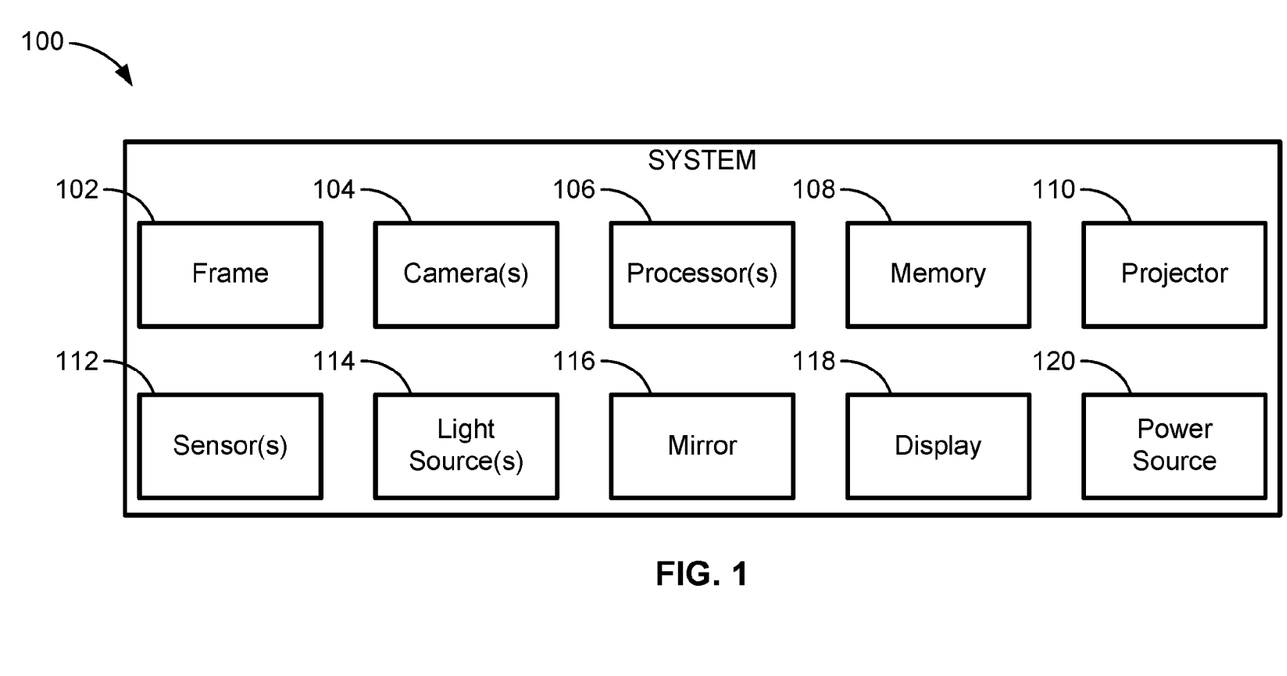
FIG. 1 is a block diagram of a virtual mirror system, according to some implementations of the present disclosure.

Referring to FIG. 1, a virtual mirror system 100 includes a frame 102, one or more cameras 104, one or more processors 106, one or more memory devices 108, and a projector 110. The virtual mirror system 100 uses the projector 110 to display a virtual mirror image (see FIG. 5) of a subject on a vertical surface based on image data generated from the one or more cameras 104. The virtual mirror image appears to the subject as if the subject were standing in front of a mirror even though, in some implementations, no mirror is present in front of the subject.

The frame 102 is configured to be coupled to and/or mounted on (e.g., directly or indirectly) a wall, a counter (e.g., a bathroom vanity), furniture, or any other structure. The one or more cameras 104 are coupled to and/or mounted on (e.g., directly or indirectly) the frame 102. The one or more cameras 104 can be digital cameras, infrared (IR) cameras, three-dimensional cameras (e.g., depth cameras), or any other type of camera. In implementations where the one or more cameras 104 includes a plurality of cameras, the multiple cameras can be the same type of camera (e.g., two digital cameras) or different types of cameras. The one or more cameras 104 are configured to generate image data reproducible as one or more images (e.g., still images, video images, or both). The virtual mirror system 100 can include one camera 104, two cameras 104, three cameras 104, five cameras 104, etc. that are coupled to and/or mounted on different locations of the frame 102 (e.g., opposite sides of the frame 102).

The memory device 108 generally contains processor-executable instructions that when executed by the one or more processors 106 cause the one or more processors 106 to actuate and/or control the various components of the virtual mirror system 100 (e.g., actuate the cameras 104 and cause the cameras 104 to generate image data, cause the projector to display an image or video feed, etc.). The memory device 108 can also store the image data generated by the one or more cameras 104.

The virtual mirror system 100 also includes a power source 120 for providing power to the one or more processors 106, the memory device 108, and the other various components of the virtual mirror system 100. The power source 120 can include an AC power source, a battery (e.g., a rechargeable battery), or both.

The projector 110 is coupled to the frame 102 (e.g., generally between a first camera and a second camera of the one or more cameras 104) and is generally configured to display images (e.g., still images, video images, or both) on a surface. More specifically, the projector 110 is configured to emit electromagnetic radiation onto a surface to cause the image(s) to be displayed on the surface. In particular, the one or more processors 106 are configured to cause the projector 110 to display image(s) generated by the one or more cameras 102. In some implementations, the displayed image(s) are a real-time video feed that represents a subject standing adjacent to (e.g., in front of) the virtual mirror system 100.

In some implementations, the projector 110 is a short-throw projector and/or an ultra-short-throw projector. The term "throw" refers to the distance between the projector 110 and the surface to be projected on by the projector 110. Short-throw and ultra-short-throw projectors include one or more lenses with a wide angle that allow the projector 110 to be positioned close to the surface to be projected on while maintaining a clear image. For example, a short-throw or ultra-short-throw projector can be positioned between about 1 inch and about 36 inches away from the surface to be projected on, between about 3 inches and about 30 inches away from the surface to be projected on, between about 6 inches and about 24 inches away from the surface to be projected on, etc. The term "throw ratio" refers to the ratio of the throw distance and the sized of the projected display (e.g., if the projector is 1 foot away from the screen and the display is 1 foot, the throw ratio is 1). The projector 110 can have a throw ratio that is between about 0.4 and about 1, between about 0.6 and about 0.8, between about 0.3 and about 0.5, etc. For example, if the throw ratio is 0.4 and the projector 110 is positioned 6 inches away from the surface to be projected on, the display is 24 inches (typically measured diagonally). In some implementations, the projector 110 includes one or more microelectromechanical systems (MEMS) and/or one or more mirrors configured to aid in projecting the image(s) onto to the surface, for example, if the surface is not within the direct line of sight of the lens of the projector 110.

In some implementations, the virtual mirror system 100 also optionally includes one or more sensors 112, one or more light sources 114, a mirror 116, an electronic display 118, or any combination thereof. The one or more sensors 112 are coupled to the frame 102 and can include a plurality of different types of sensors. For example, the sensors 112 can include a motion or proximity sensor (e.g., that uses electromagnetic radiation) configured to detect the presence of an object or person in front of the virtual mirror system 100 (which can cause the processors 106 to actuate the cameras 104, for example) and/or a depth sensor configured to determine a distance between the object or person from the frame 102.

The optional one or more light sources 114 are coupled to the frame 102 and generally used for illumination of the subject adjacent to the virtual mirror system 100. The light sources 114 can be light emitting diodes (LEDs) having variable color and intensity values that can be controlled by the processor 106. Alternatively, the light sources 114 can be incandescent light bulbs, halogen light bulbs, fluorescent light bulbs, black lights, discharge lamps, or any other suitable light source. The light sources 114 can also be rotationally or translationally coupled to the frame 102 or other parts of the virtual mirror system 100 such that the light sources 114 can be physically adjusted by a user and emit light in different directions. The light sources 114 could also be disposed in individual housings that are physically separated from the frame 102. The light sources 114 are configured to produce light that is generally directed outward away from the frame 102 and toward an object or user or subject adjacent to the virtual mirror system 100. The light produced by the one or more light sources 114 can thus be used to illuminate the user (or any other object). Because they are variable in color and intensity, the light sources 114 can thus be used to adjust the ambient light conditions surrounding the user.

The optional mirror 116 is of a type that is generally referred to as a one-way mirror, although it is also sometimes referred to as a two-way mirror. The mirror 116 can be configured transmit a first portion of light that is incident on its surfaces to the other side of the mirror, and to reflect a second portion of the light that is incident on its surfaces. This may be accomplished by applying a thin layer of a partially reflective coating to a generally transparent substrate material, such that less than all of the incident light is reflected by the partially reflecting coating. The remaining light is transmitted through the mirror 116 to the other side thereof. Similarly, some light that strikes the mirror 116 on a side opposite the side where a user is standing will be transmitted through the mirror 116, allowing the user to see that transmitted light. This partially reflective coating can generally be applied to a surface of the substrate material on the display-side of the substrate material, the user-side of the substrate material, or both. The user-side of the substrate is the side or surface of the mirror that faces a user. The display-side of the substrate is the opposite side as the user-side, and faces the surface to which the mirror is coupled. Thus, the partially reflective coating can be present on the surface of one or both of the display-side and the user-side of the mirror 116. In some implementations, the partially reflective coating is made of silver. The generally transparent material can be glass, acrylic, or any other suitable material. The mirror 116 can have a rectangular shape, an oval shape a circle shape, a square shape, a triangle shape, or any other shape and/or combination thereof.

The display 118 is coupled to or mounted on the frame. The electronic display 118 can be any suitable device, such as an LCD screen, an LED screen, a plasma display, an OLED display, a CRT display, or the like. As described herein, in some implementations, the virtual mirror system 100 optionally includes the mirror 116. In such implementations, the display 118 can be positioned in close proximity to the mirror 116. Due to the partially reflective nature of the mirror 116, when the display 118 is activated (e.g., turned on and emitting light to display an image), a user standing on the user-side of the mirror 116 is able to view any portion of the display 118 that is emitting light through the mirror 116. When the display 118 is turned off, light that is incident on the user-side of the mirror 116 from the surroundings will be partially reflected and partially transmitted. Because the display 118 is off, there is no light being transmitted through the mirror 116 to the user-side of the mirror 116 from the display-side. Thus, the user standing in front of the mirror 116 will see their reflection due to light that is incident on the user-side of the mirror 116 and is reflected off of the mirror 116 back at the user. When the display 118 is activated, a portion of the light produced by the display 118 that is incident on the mirror 116 from the display-side is transmitted through the mirror 116 to the user-side. The mirror 116 and the display 118 are generally configured such that the intensity of the light that is transmitted through the mirror 116 from the display 118 at any given point is greater than the intensity of any light that is reflected off of that point of the mirror 116 from the user-side. Thus, a user viewing the mirror 116 will be able to view the portions of the display 118 that are emitting light, but will not see their reflection in the portions of those mirror 116 through which the display light is being transmitted.

Figure 2A:
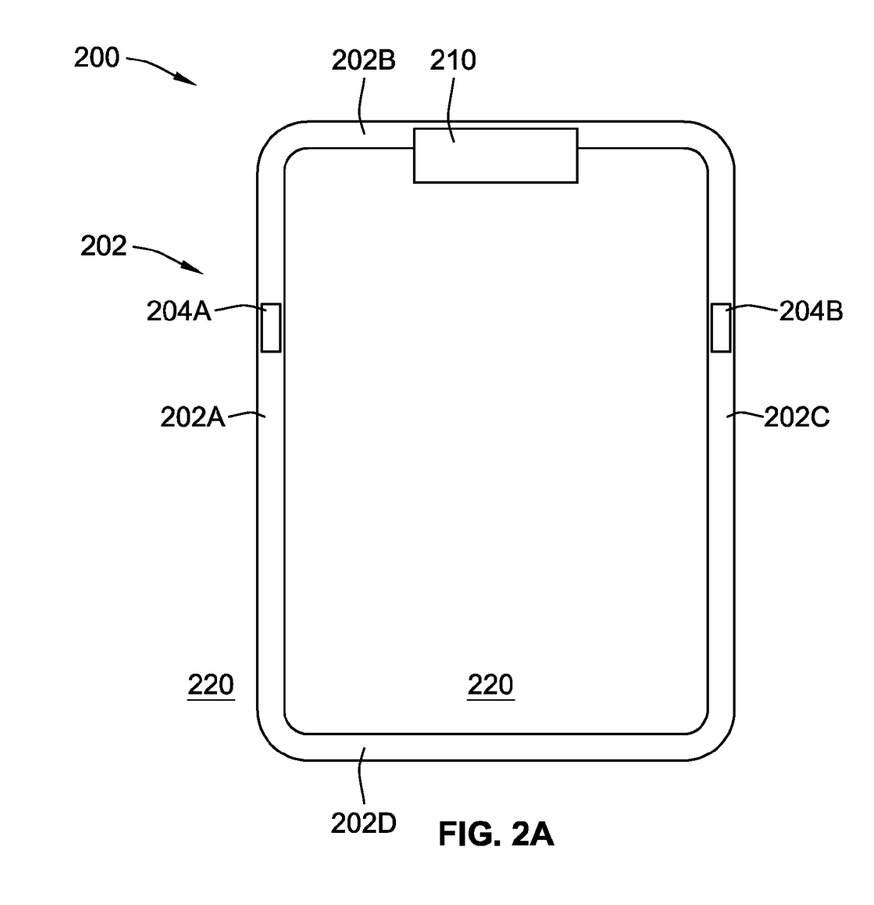
FIG. 2A is a front elevation view of a virtual mirror system, according to some implementations of the present disclosure.

Referring to FIG. 2A, a virtual mirror system 200 that is the same as, or similar to, the virtual mirror system 100 (FIG. 1) includes a frame 202, a first camera 204A, a second camera 204B, and a projector 210. As shown, the frame 202 is coupled to or mounted on a vertical surface 220. The frame 202 has a generally rectangular shape and includes a left vertical segment 202A, an upper horizontal segment 202B, a right vertical segment 202C, and a lower horizontal segment 202D. While the frame 202 is shown as being generally rectangular, the frame 202 can have any other shape (e.g., circular, oval, triangular, polygonal, or any combination thereof).

The vertical surface 220 can be, for example, a wall (e.g., drywall, concrete, wood, etc.). As described herein, in some implementations, the virtual mirror system 200 optionally includes a mirror (not shown) that is the same as, or similar to, the mirror 116. In such implementations, the mirror can be coupled to and/or mounted on the vertical surface 220.

The first camera 204A and the second camera 204B of the virtual mirror system 200 are the same as, or similar to, the one or more cameras 104 of the virtual mirror system 100 (FIG. 1) described herein. As shown, the first camera 204A is coupled to the left vertical segment 202A of the frame 202 and the second camera 204B is coupled to the right vertical segment 202B of the frame 202. The first camera 204A and/or the second camera 204B can be coupled to an outer surface of the frame 202 or, alternatively, the first camera 204A and/or the second camera 204B can be coupled to the frame 202 such that the first camera 204A and/or the second camera 204B are partially or fully integrated and/or recessed within a portion of the frame 202. More generally, the first camera 204A and/or the second camera 204B can be positioned at any location on the frame 202. For example, in some implementations, both the first camera 204A and the second camera 204B can be coupled to the upper horizontal segment 202B or the lower horizontal segment 202D.

While the first camera 204A and the second camera 204B are shown in FIG. 2A as being generally aligned along a horizontal axis, in some implementations, the first camera 204A and the second camera 204B can be positioned such that the first camera 204A and the second camera 204B are aligned along a vertical axis (e.g., both the first camera 204A and the second camera 204B are positioned on the left vertical segment 202A of the frame 202). Alternatively, in some implementations, the first camera 204A and the second camera 204B are not aligned along either a horizontal axis or a vertical axis. For example, in such implementations, the first camera 204A can be positioned in a top left corner of the frame 202 (e.g., in the general area where the left vertical segment 202A meets the upper horizontal segment 202B) and the second camera 204B can be positioned in a bottom right corner of the frame 202 (e.g., in the general area where the right vertical segment 202C meets the lower horizontal segment 202D). Moreover, while the virtual mirror system 200 is shown as having two cameras (first camera 204A and second camera 204B), more generally, the virtual mirror system 200 can have any suitable number of cameras (e.g., one camera, three cameras, four cameras, etc.)

Figure 5:
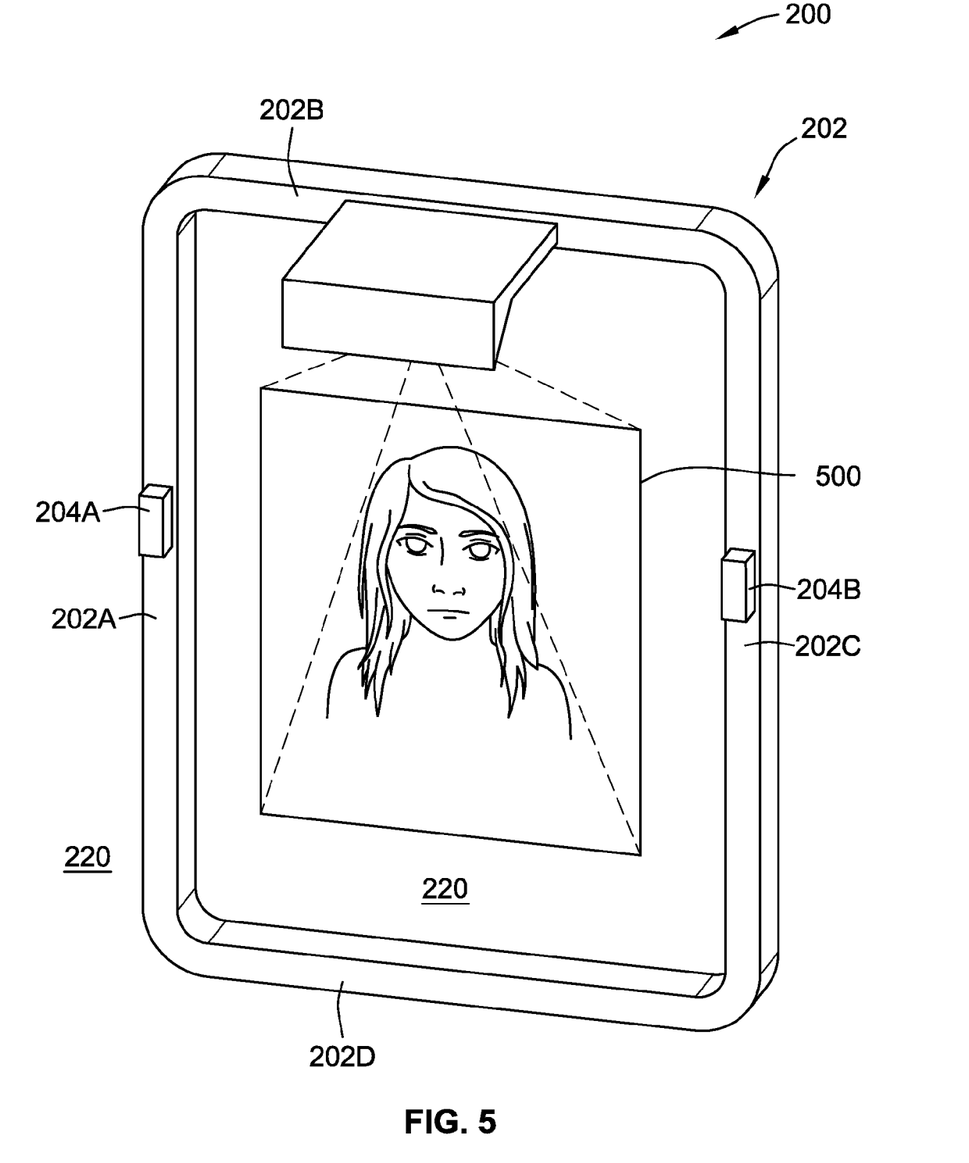
FIG. 5 is perspective view of the virtual mirror system of FIGS. 2A-2B with a virtual mirror image projected onto a vertical surface, according to some implementations of the present disclosure.

The first camera 204A and the second camera 204B are preferably coupled to the frame 202 such that they are positioned at approximately eye level of a subject standing in front of the virtual mirror system 200. That is, the first camera 204A and the second camera 204B are positioned at a height relative to a floor or other surface that the subject is standing on so that they are approximately eye level with the subject. The height can be, for example, between about 4 feet and about 6 feet, between about 4.5 feet and about 5.5 feet, about 5 feet (which approximates an average eye level), etc. In some implementations, the first camera 204A and the second camera 204B are moveable relative to the frame 202 to adjust the height of the first camera 204A and the second camera 204B relative to the eye level of a particular subject (e.g., the subject can manually move the first camera 204A and/or the second camera 204B so that they are at eye level). In some implementations, the virtual mirror system 200 is configured to detect the eyes of the subject (e.g., by applying facial recognition algorithms to the first image data and/or second image data) and automatically adjust the vertical position of the first camera 202A and/or the second camera 202B to account for subjects having different heights. Alternatively, in some implementations, the frame 202 or a portion of the frame 202 is moveable relative to the vertical surface 220 to position the first camera 204A and the second camera 204B at approximately eye level of the subject. Positioning the first camera 204A and the second camera 204B at approximately eye level aids in processing the generated image data and generating the virtual mirror image of a subject, which is described in further detail herein. For example, as shown in FIG. 5, the first camera 204A and the second camera 504B are generally eye-level with the subject 400 in the virtual mirror image 500.

Figure 2B:
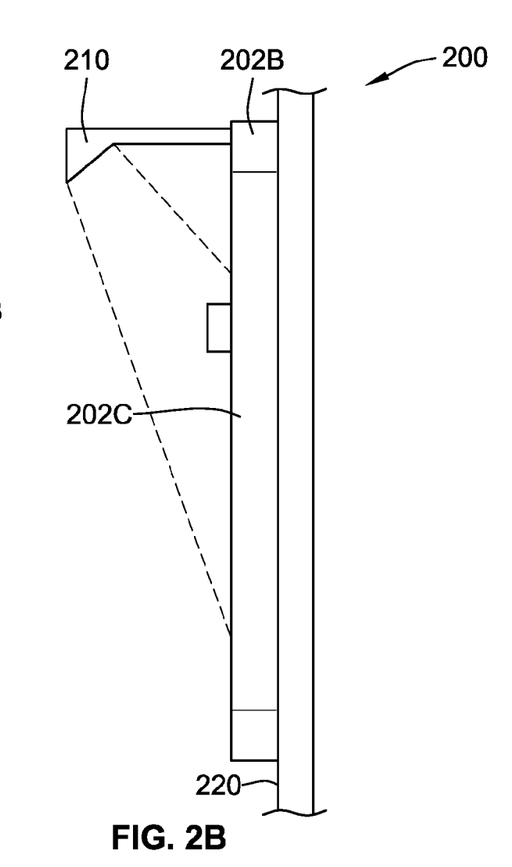
FIG. 2B is a side view of the virtual mirror system of FIG. 2A, according to some implementations of the present disclosure.

The projector 210 is the same as, or similar to, the projector 110 of the virtual mirror system 100 (FIG. 1) described herein. More specifically, the projector 210 is a short-throw and/or ultra-short throw projector configured to emit electromagnetic radiation to display one or more images on the vertical surface 220, as best shown in FIG. 2B. The projector 210 is coupled to the frame 202 such that a distance between a lens of the projector 210 and the vertical surface 220 is between about 6 inches and about 24 inches, for example. The close proximity of the projector 210 and the vertical surface 220 allows the image(s) to be projected onto the vertical surface 220 without a subject or other object blocking or casting a shadow on the projected image. For example, if the projector 210 were mounted (e.g., on a ceiling) such that a subject could stand between the vertical surface 220 and the projector 210, the subject may obscure or block the projected image. However, because the projector 210 is in close proximity to the vertical surface 220, it is very unlikely that the subject will be standing between the lens of the projector 210 and the vertical surface 220.

While the projector 210 is shown in FIGS. 2A and 2B as being coupled or mounted to the upper horizontal segment 202B of the frame 202, more generally, the projector 210 can be coupled or mounted to any location on the frame 202 (e.g., the left vertical segment 202A, the right vertical segment 202C, or the lower horizontal segment 202D). In some implementations, the virtual mirror system 200 is positioned above a vanity or cabinet in a bathroom or bedroom, for example. In such implementations, it is advantageous for the projector 210 to be coupled or mounted to the upper horizontal segment 202 so that the projector 210 (which protrudes from the frame 202) does not interfere or impede access to a countertop or a sink. Alternatively, in some implementations, the projector 210 can be coupled or mounted to a ceiling or other structure within a close proximity (e.g., between about 6 inches and 24 inches) of the vertical surface 220.

In some implementations, the virtual mirror system 200 also includes a mirror, one or more sensors, one or more light sources, a display, or any combination thereof, which are the same as, or similar to, the one or more sensors 112, the one or more lights sources 114, the mirror 116, and the display 118 of the virtual mirror system 100 (FIG. 1) described herein. For example, in such implementations, the mirror can be coupled to the frame 202 such that the segments 202A-202D form a border or perimeter around the mirror. As described herein, the mirror can be only partially reflective such that the image(s) projected by the projector 210 are visible to a subject standing in front of the mirror.

In implementations where the virtual mirror system 200 includes one or more sensors, these sensors can be used to allow a user (e.g., the subject 400) to interact with the displayed image(s). The sensors can be configured to detect the presence of a hand, finger, face, or other body part of the user when the user is within a threshold distance from the frame 202 and/or vertical surface 220. When the sensors detect the presence of the user aligned with a threshold distance, the processor is configured to cause the system 200 to react as if the user had touched or clicked a touchscreen display on the vertical surface 220 and/or the frame 202. Thus, the sensors are able to transform the frame 202 and/or vertical surface 220 into a virtual touch-sensitive display, where the user can interact with and manipulate the virtual display (projected by the projector 210) by touching the frame 202 and/or the vertical surface 220 located within the frame 202, or even bringing their fingers, hands, face, other body part in close proximity thereto. The sensors (whether IR transmitter/receiver pairs and/or proximity sensors) can be used to determine different types of interactions between the user and the system 200. For example, the system 200 can determine whether the using is swiping horizontally (left/right), vertically (up/down), diagonally (a combination of left/right and up/down), or any combination thereof. The system 200 can also detect when the user simply taps somewhere instead of swiping. For example, a user-selectable icon may be projected or displayed on the vertical surface 220 via the projector 210, and the user can select the user-selectable icon through gestures. A variety of different applications and programs can be run by the processor and displayed on the vertical surface 220 via the projector 210, including touch-based applications designed for use with touch screens, such as mobile phone applications.

Figure 3:
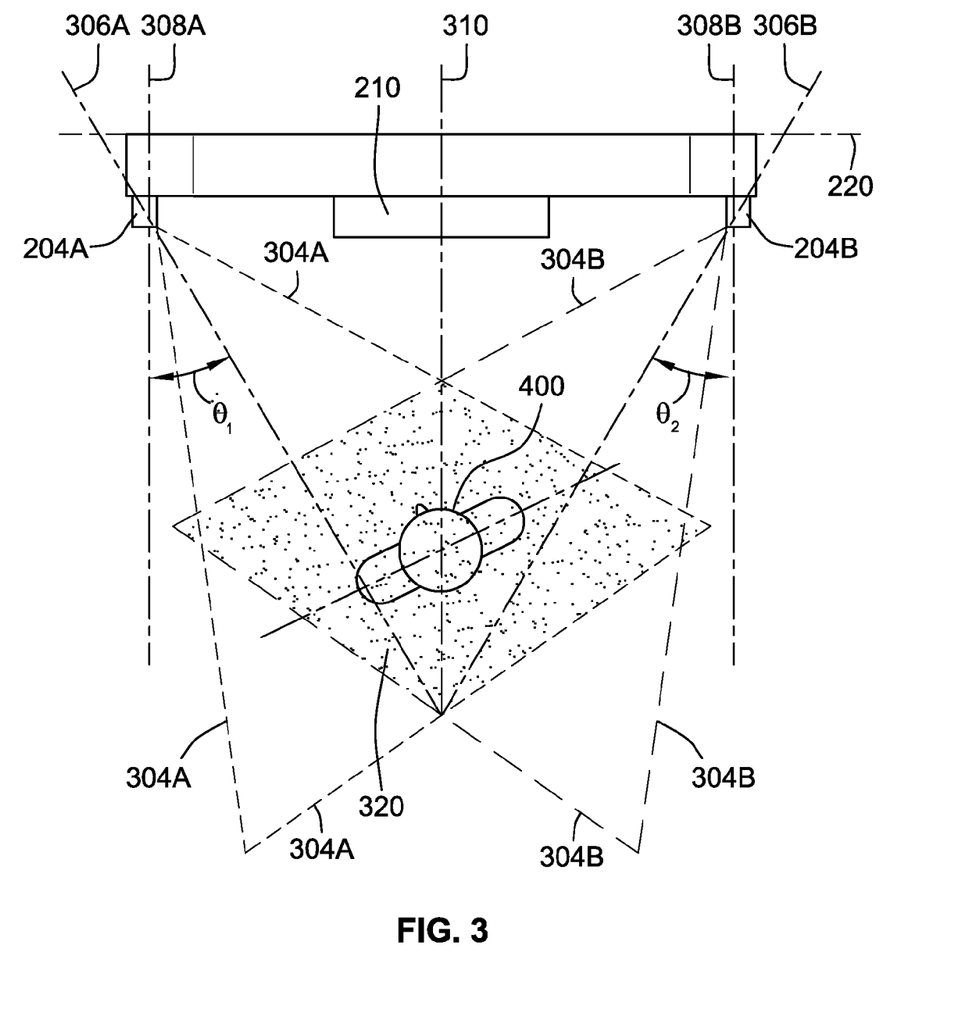
FIG. 3 is a plan view of the virtual mirror system of FIGS. 2A-2B, according to some implementations of the present disclosure.

Referring to FIG. 3, the first camera 204A has a first field of view 304A having a central axis 306A. Similarly, the second camera 204B has a second field of view 304B having a central axis 306B. The central axis 306A of the first field of view 304A is at a first angle $\theta_1$ relative to a first vertical axis 308A (which is parallel to the central axis 310 of the frame 202). Similarly, the central axis 306B of the second field of view 304B is at a second angle $\theta_2$ relative to a second vertical axis 308B (which is parallel to the central axis 310 of the frame 202). The first angle $\theta_1$ can be the same as, or different than, the second angle $\theta_2$. The first angle $\theta_1$ and the second angle $\theta_2$ can be between about 0 degrees and about 45 degrees, between about −30 degrees and about 75 degrees, between about −10 degrees and about 10 degrees, between about 30 degrees and about 60 degrees, or between about 0 degrees and 30 degrees. As shown in FIG. 3, the first field of view 304A and the second field of view 304B overlap with one another at an area 320 (shaded area). Alternatively, the first field of view 304A and the second field of view 304B may not overlap with one another depending on the value of the first angle $\theta_1$ and/or the second angle $\theta_2$ and/or the scope/size of the field of views 304a, 304B of the first camera 204A and the second camera 204B. Further, while the central axis 306A and the central axis 306B are shown as intersecting in FIG. 3, in some implementations, the central axis 306A and the central axis 306B do not intersect (e.g., the first angle $\theta_1$ and the second angle $\theta_2$ are both 0 degrees or less).

When a subject (e.g., a human) is positioned in front of the virtual mirror system 200 and at least a portion of the subject is within the first field of view 304A of the first camera 204 and the second field of view 304B of the second camera 204B, the first camera 204A has a first point of view of the subject that is different than a second point of view of the second camera 204B. This difference in points of view of the cameras is caused by the different positions of the first camera 204A and the second camera 204B relative to the subject.

Figure 4A:
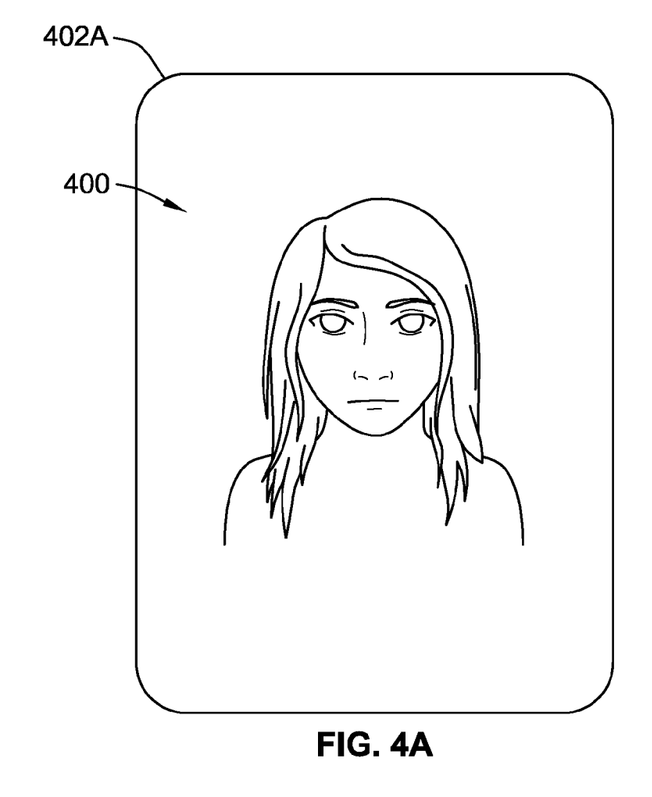
Figure 4B:
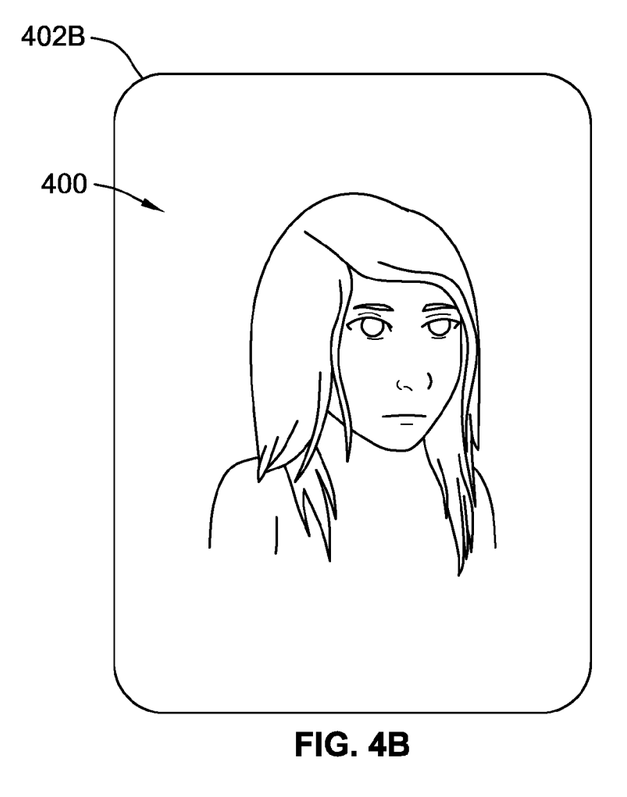
FIG. 4B is an exemplary second image of the subject generated by a second camera of the virtual mirror system of FIGS. 2A-2B at a second point of view, according to some implementations of the present disclosure.

For example, referring to FIG. 4A, an exemplary image 402A of a subject 400 generated by the first camera 204A is shown. In the image 402A, the face of the subject 400 is turned slightly away from the central axis 306A (FIG. 3) of the first camera 204B. That is, the image 402A has a first point of view of the subject 400 that is based on the position and orientation of the subject 400 relative to the central axis 306A (FIG. 3) of the first camera 204A. Referring to FIG. 4B, an exemplary image 402B of the subject 400 (where the subject 400 was positioned at the same location and orientation as when the image 402A was generated) generated by the second camera 204B is shown. In the image 402B, the subject 400 is shown at a different orientation relative to the second camera 204B than the orientation relative to the first camera 204A. That is, as shown by a comparison of FIGS. 4A and 4B, the first camera 204A has a different point of view of the subject 400 than the second camera 204B.

Referring to FIG. 5, an exemplary virtual mirror image 500 of the subject 400 (FIGS. 4A-4B) is displayed (projected) by the projector 210 onto the vertical surface 220 within the frame 202. As described in further detail herein, the virtual mirror image 500 is generated based on the first image data from the first camera 204A and the second image data from the second camera 204B. As shown, the subject 400 appears in the virtual mirror image 500 as if the subject 400 is standing directly in front of the frame 202. In other words, from the subject's perspective, the virtual mirror image 500 appears to be the same or substantially the same as if the subject 400 were standing in front of a mirror, even though no mirror is present within the frame 202 (e.g., in this implementation). When the subject is only within the field of view of one of the first camera 204A or the second camera 204B, the virtual mirror image 500 is generated based on the image data from that camera (e.g., if the subject is only within the first field of view 304A (FIG. 3), the virtual mirror image 500 is generated based on only the first image data). In some implementations, the virtual mirror image 500 is continuously updated in substantially real-time (e.g., with little latency) based on continuously generated image data from the first camera 204A and/or the second camera 204B to create a substantially real-time virtual mirror video image of the subject 400. The latency can be less than about 20 milliseconds, less than about 10 milliseconds, less than about 5 milliseconds, less than about 2 milliseconds, between about 10 microseconds and about 50 microseconds, etc. As used herein, the term "real-time" as used at least in connection with the virtual mirror image 500, refers to implementations where the system 200 processes the first image data and/or the second image data and displays the virtual mirror image 500 within the time frames or periods discussed herein.

While the virtual mirror image 500 is shown as being a front facing view of the subject 400 (e.g., as if the subject 400 were looking directly straight at a mirror), in some implementations, the virtual mirror image 500 can be a profile or partial profile view of the subject 400. In other implementations, the virtual mirror system 200 includes a third camera (not shown) that is positioned behind the subject 400. In such implementations, the third camera is configured to generate third image data reproducible as one or more images of at least a portion of the subject 400. Given the relative position of the third camera behind the subject 400, a third field of view of the third camera is generally directed in the opposite direction as the first field of view 304A of the first camera 204A and the second field of view 304B of the second camera 204B (FIG. 3). Thus, for example, while a first side of the subject 400 (e.g., a face) is facing the first and second cameras 204A-204B, a second opposing side of the subject 400 (e.g., the back of the head) is facing the third camera. In such implementations, the projector 210 can project a reverse virtual mirror image of the subject 400 similarly to the virtual mirror image 500. However, the reverse virtual mirror image of the subject 400 appears as if the subject 400 is looking directly at the opposite side of their body as the side that would be facing a mirror. This is advantageous compared to a conventional mirror, where the subject 400 could not see the side or portion of their body that is not facing the mirror. The virtual mirror system 200 can be configured to toggle between the virtual mirror image 500 and the reverse virtual mirror image so that the user can see all sides or portions of their body displayed on the vertical surface 220.

Figure 6:
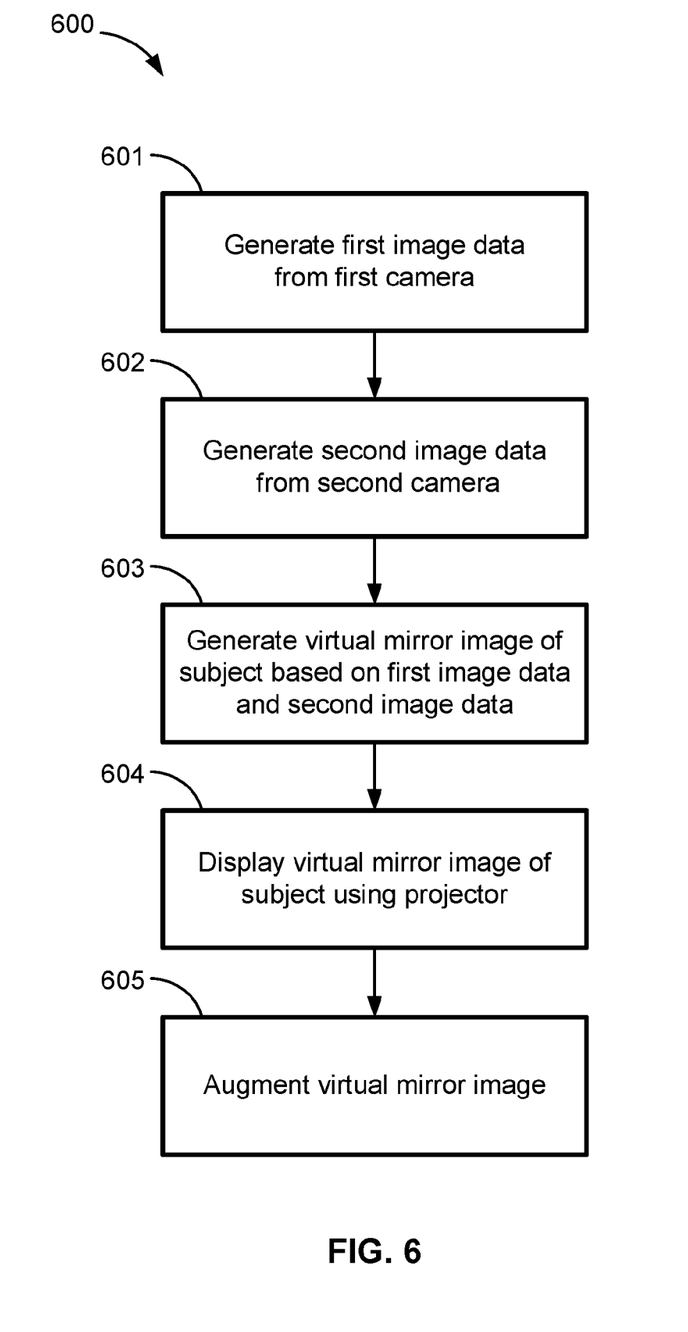
FIG. 6 is a process flow diagram for a method of displaying a virtual mirror image of a subject, according to some implementations of the present disclosure.

Referring to FIG. 6, a process-flow diagram of a method 600 for generating a virtual mirror image of a subject (e.g., a human being) is illustrated. While the method 600 is described herein as being implemented using the virtual mirror system 200 (FIGS. 2A-5), more generally, the method 600 can be implemented using a system that is the same as, or similar to, the virtual mirror system 100 (FIG. 1) and/or the virtual mirror system 200 (FIGS. 2A-5).

The first step 601 of the method 600 includes generating first image data reproducible as one or more first images of at least a portion of the subject 400 using the first camera 204A. The first image data can be stored in one or more memory devices of the virtual mirror system 200 for later processing by one or more processors of the virtual mirror system 200 during step 603 of the method 600. The generation of the first image data during the first step 601 can be automatically triggered by one or more processors of the virtual mirror system 200. For example, in implementations in which the virtual mirror system 200 includes one or more sensors (e.g., a proximity sensor or a motion sensor), the processors can actuate the first camera 204A responsive to detecting that a subject is within a predetermined distance or proximity of the frame 202 (e.g., 1 foot, 2 feet, six feet, ten feet, etc.) Alternatively, the generation of the first image data during the first step 601 can be actuated or triggered manually by, for example, the subject. Alternatively, the generation of the first image data can be continuous and never off, such that the virtual mirror system 200 is always on and acting as a virtual mirror whether motion is detected in its vicinity or not.

The second step 602 of the method 600 is similar to the first step 601 of the method 600 and includes generating second image data reproducible as one or more second images of at least a portion of the subject (e.g., subject 400) using the second camera 204B. Step 602 can be substantially simultaneous and/or synchronized with step 601. That is, the first camera 204A and the second camera 204B can generate the first image data and the second image data, respectively, at the same time and/or at about the same time. In some implementations, only one of step 601 and 602 is performed if the subject is only positioned within the field of view of one of the first camera 204A and the second camera 204B.

The third step 603 of the method 600 includes generating the virtual mirror image 500 of the subject 400 (FIG. 5) based on the first image data, the second image data, or both. As described herein, the virtual mirror image 500 appears to the subject 400 as if the subject 400 is standing directly in front of a mirror, even though first camera 204A and/or the second camera 204B do not have such a point of view of the subject 400. Various algorithms (e.g., machine learning algorithms) can be applied to the first image data and/or the second image data to generate the virtual mirror image 500 having this point of view. For one example, a generative adversarial network (GAN) can be used to generate the virtual mirror image 500. A GAN typically uses two neural networks: a generative network and a discriminative network. In cases where both the first image data and the second image data is used to generate the virtual mirror image 500, the merging of the first image data and the second image data using heuristics or other algorithms can correct occlusion and generally leads to a more accurate virtual mirror image 500 than using the first image data or the second image data alone. In some implementations, generating the virtual mirror image 500 during step 603 includes generating a three-dimensional model of at least a portion of the subject (e.g., the face or head) using the first image data and/or the second image data. Various points of view of the subject 400 (e.g., front facing, profile, partial profile) can then be generated based on the three-dimensional model of the subject 400.

The fourth step 604 of the method 600 includes displaying the virtual mirror image 500 of the subject 400 generated during the third step 603 on the vertical surface 220 using the projector 210. As shown in FIG. 5, the projector 210 projects the virtual mirror image 500 onto the vertical surface 220 such that the virtual mirror image 500 appears as if the subject 400 is standing directly in front of a mirror. The virtual mirror image 500 can be displayed continuously, or for a predetermined time period (e.g., five seconds, ten seconds, thirty seconds, one minute, ten minutes, etc.)

In some implementations, the method 600 optionally includes a fifth step 605, which includes augmenting the virtual mirror image 500 that is displayed during the fourth step 604. For example, in some implementations, the user (e.g., the subject 400) can select the point of view of the subject 400 in the virtual mirror image 500 (e.g., a partial profile view of the subject 400), providing up to a 360 degree visualization of the subject 400. This allows the subject 400 to see many different points of view of the subject 400 that would not otherwise be visible if the subject 400 were simply looking at a mirror. In some implementations, augmenting the virtual mirror image 500 includes zooming in (e.g., magnifying) or zooming out an area of interest in the virtual mirror image 500 (e.g., responsive to one of the user inputs described herein). The area of interest could be the eyes, noses, ears, mouth, teeth, etc., or any other feature on the subject 400. In such implementations, the projector 210 can display instructions that indicate to the subject 400 how to manipulate the magnification of the virtual mirror image 400 (e.g., by pinching and/or swiping).

As another example, in some implementations, augmenting the virtual mirror image 500 during step 605 can assist the subject 400 in conducting activities (e.g., applying makeup, brushing teeth, brushing hair, shaving, etc.) by highlighting portions of the face of the subject 400 where they need to apply the product. For example, indicia can be displayed on portions of the virtual mirror image 500 to indicate to the subject 400 where to conduct an activity (e.g., to show where the user needs to apply a production). The indicia can have any suitable shape or form, such as dots, circles, squares, triangles, curves, arcs, arches, lines, any combination thereof, or any other suitable shape. Alternatively, the projector 210 can display an image or a series of images showing the steps (e.g., a tutorial) with the virtual mirror image 500 to aid the subject 400 in completing activities. In one implementation, the projector 210 displays an animated GIF (Graphics Interchange Format) that shows the steps to the subject.

As yet another example, in some implementations, augmenting the virtual mirror image 500 includes allowing the subject 400 to see what they may look like after the application of different types of products or procedures, for example applying different hair dye or getting different hair styles. The projector 210 can display a plurality of user-selectable options, each of which is associated with a unique modification of a first characteristic related to the subject 400. Responsive to the selection of one of the user-selectable options, the virtual mirror image 500 can be modified to show the subject 400 with the selected modification of the characteristic (e.g., hair color).

Other implementations of the virtual mirror system 200 are contemplated in accordance with the present disclosure. For example, the system 200 can connect to a multitude of other devices, such as mobile phones, laptop computers, desktop computers, online servers, fitness trackers, Internet-connected scales, cloud services, Internet-connected water bottles, Internet-connected thermostats, or other devices. In some such implementations, the subject's smart phone and/or tablet can be used as an input device to control the system 200 by mirroring the virtual mirror image 500 on a display of the smart phone and/or tablet and allowing the user to control the system 200 by touching and/or tapping the smart phone and/or tablet directly.

In some implementations, the sensors include a microphone that detects and/or records the voice of the user. The data from the microphone can be sent to the processor to allow the user to interact with the system using their voice. The system 200 can also include one or more speakers to play music, podcasts, radio, or other audio. The one or more speakers can also provide the user feedback or confirmation of certain actions or decisions.

In some implementations, the virtual mirror system 200 uses an object recognition (OR) algorithm that utilizes principles of computer vision to detect and identify a variety of objects based on the still or video images captured by the first camera 204A and/or the second camera 204B. The processor(s) of the virtual mirror system 200 can be configured to modify the execution of an application being executing by the processor, such as automatically launching a new application or taking a certain action in an existing application, based on the object that is detected and identified by the cameras and the processor. For example, following the detection of an object in the user's hand and the identification of that object as a toothbrush, the processor can be configured to automatically launch a tooth-brushing application to run and be displayed using the projector 210. As another example, the processor can be configured to automatically launch an application to assist the user in shaving upon detecting and identifying a razor, or an application to assist the user in applying makeup upon detecting and identifying any sort of makeup implement, such as lipstick, eye shadow, etc. The cameras 204A and 204B can also recognize faces of users and differentiate between multiple users. For example, the camera 20 may recognize the person standing in front of the frame 202 and execute an application that is specific to that user. For example, the application could display stored data for that user, or show real-time data that is relevant to the user.

One or more elements or aspects or steps, or any portion(s) thereof, from one or more of any of claims 1-42 below can be combined with one or more elements or aspects or steps, or any portion(s) thereof, from one or more of any of the other claims 1-42 or combinations thereof, to form one or more additional implementations and/or claims of the present disclosure.

While the present disclosure has been described with reference to one or more particular implementations, those skilled in the art will recognize that many changes may be made thereto without departing from the spirit and scope of the present disclosure. Each of these implementations and obvious variations thereof is contemplated as falling within the spirit and scope of the present disclosure. It is also contemplated that additional implementations according to aspects of the present disclosure may combine any number of features from any of the implementations described herein.

What is claimed is:

1. A virtual mirror system comprising:
   a frame;
   a first camera coupled to a first segment of the frame and being configured to generate first image data reproducible as one or more first images of at least a portion of a subject that is positioned within a first field of view of the first camera;
   a second camera coupled to a second segment of the frame and being configured to generate second image data reproducible as one or more second images of at least a portion of the subject that is positioned within a second field of view of the second camera, the second camera being positioned relative to the first camera such that a portion of the first field of view overlaps with a portion of the second field of view to define a virtual mirror area;
   a projector configured to display images on a surface, wherein the projector is located on a user-side of the virtual mirror;
   a display configured to emit light on the surface, wherein the display is located on a display-side of the virtual mirror;
   a memory storing machine-readable instructions; and
   a control system including one or more processors configured to execute the machine readable instructions to:
      cause the projector to display, on the surface, a virtual mirror image of the subject based on the first image data and the second image data, wherein the virtual mirror appears to the subject as a mirror image of the at least a portion of the subject; and
      cause the display to emit light such that the light is visible on the surface to augment the virtual mirror image of the subject.

2. The virtual mirror system of claim 1, wherein the projector is coupled to (i) the frame or (ii) a ceiling that is generally perpendicular to the surface.

3. The virtual mirror system of claim 1, wherein the surface is a wall or a mirror coupled to the frame.

4. The virtual mirror system of claim 1, wherein the virtual mirror image of the subject is a still image or a video image.

5. The virtual mirror system of claim 1, wherein the virtual mirror image is displayed in substantially real-time.

6. The virtual mirror system of claim 1, wherein the first camera is coupled to a left vertical segment of the frame and the second camera is coupled to a right vertical segment of the frame.

7. The virtual mirror system of claim 6, wherein the second camera is coupled to the frame such that the second camera is spaced from and parallel to the first camera.

8. The virtual mirror system of claim 1, wherein the projector includes one or more MEMs devices.

9. The virtual mirror system of claim 1, wherein a distance between a lens of the projector and the surface is between about 6 inches and about 24 inches.

10. The virtual mirror system of claim 1, further comprising a depth sensor or one or more light sources coupled to the frame.

11. The virtual mirror system of claim 1, wherein the second field of a view is a front view of the subject, a profile view of the subject, or a partial profile view of the subject.

12. The virtual mirror system of claim 1, wherein the first field of view is a partial profile view of the subject and the second field of view is a front view of the subject.

13. The virtual mirror system of claim 1, wherein the virtual mirror image is generated using a generative adversarial network (GAN).

14. The virtual mirror system of claim 1, wherein the second field of view is different than the first field of view.

15. The virtual mirror system of claim 1, wherein the virtual mirror image has a third field of view of the subject that is different than the first field of view and the second field of view.

16. A virtual mirror system comprising:
   a first camera positioned to a first side of a subject and configured to generate first image data that is associated with the subject when the subject is positioned within a first field of view (FOV) of the first camera, the first camera being mounted such that a central axis of the first FOV is at a first angle relative to a first vertical plane and at a second angle relative to a first horizontal plane;
   a second camera positioned to a second side of the subject and configured to generate second image data that is associated with the subject when the subject is positioned within a second field of view (FOV) of the second camera, the second camera being mounted such that a central axis of the second FOV is at a third angle relative to a second vertical plane and at a fourth angle relative to a second horizontal plane, the second camera being positioned relative to the first camera such that a portion of the first FOV overlaps with a portion of the second FOV;
   a projector configured to emit electromagnetic radiation onto a virtual mirror surface, the projector being mounted such that a central axis of the projector is at a fifth angle relative to a third vertical plane and at a sixth angle relative to a third horizontal plane, wherein the projector is located on a user-side of the virtual mirror;
   a display configured to emit light on the surface, wherein the display is located on a display-side of the virtual mirror;

a memory storing machine readable instructions; and a control system including one or more processors configured to execute the machine readable instructions to:

generate a real-time video feed of at least a portion of the subject based at least on the first image data and the second image data;

display on the virtual mirror surface, using the projector, at least a portion of the generated real-time video feed of the portion of the subject; and cause the display to emit light such that the light is visible on the surface to augment the real-time video feed of the portion of the subject.

17. The system of claim 16, wherein the first vertical plane, the second vertical plane, and the third vertical plane are parallel.

18. The system of claim 16, wherein the first angle is between about 0 degrees and about 45 degrees, the second angle is about 0 degrees and the fourth angle is about 0 degrees, the third angle is between about 0 degrees and about 45 degrees, the fourth angle is about 0 degrees, the fifth angle is between about −10 degrees and about 10 degrees, and the sixth angle is between about 0 degrees and about 60 degrees.

19. The system of claim 16, wherein the virtual mirror surface is generally perpendicular to the first vertical plane, the second vertical plane, and the third vertical plane and to the first horizontal plane, the second horizontal plane, and the third horizontal plane.

20. A virtual mirror system comprising:

a frame;

a first camera coupled to a first vertical segment of the frame, the first camera being configured to generate first image data reproducible as one or more first images of at least a portion of a subject that is positioned within a first field of view of the first camera;

a second camera coupled to a second vertical segment of the frame, the second camera being configured to generate second image data reproducible as one or more second images of at least a portion of the subject that is positioned within a second field of view of the second camera;

a mirror coupled to the frame and being positioned between the first camera and the second camera;

a projector coupled to the frame, wherein the projector is located on a user-side of the mirror;

a display configured to emit light on the surface, wherein the display is located on a display-side of the mirror;

a memory storing machine readable instructions; and a control system including one or more processors configured to execute the machine readable instructions to:

generate a real-time video feed of at least a portion of the subject based on the first image data and the second image data;

cause the projector to continuously display the real-time video feed of the portion of the subject on at least a portion of the mirror; and cause the display to emit light such that the light is visible on the surface to augment the virtual mirror image of the subject.

* * * * *